3,479,283
SEWAGE TREATMENT
John R. Harrison, West Chester, Pa., and Daniel J. Monagle, Wilmington, Del., assignors to Hercules Incorporated, Wilmington, Del., a corporation of Delaware
No Drawing. Filed Nov. 15, 1966, Ser. No. 594,400
Int. Cl. C02c 1/00, 5/02
U.S. Cl. 210—54                                              7 Claims

ABSTRACT OF THE DISCLOSURE

The present invention relates to a process of removing suspended solids from raw influent sewage slurry wherein an acrylamide-acrylate copolymer is employed as a flocculating agent and settling aid.

---

The present invention relates to sewage treatment, and more particularly to an improved process of removing suspended solids from an aqueous raw influent sewage slurry which comprises aiding the separation of the solids from the water by contacting the sewage slurry with a flocculating agent.

In a typical sewage treatment plant the steps involved often include, in the order given, (1) primary sedimentation (usually after coarsely screening the raw sewage slurry through grit separators), (2) aeration, (3) digestion, (4) elutriation, (5) vacuum filtration, and (6) incineration.

The amount of suspended solids present in raw sewage varies widely, e.g. about 100–700 p.p.m. dry basis. When raw sewage enters a treatment plant, it is coarsely screened through grit separators and pumped to primary sedimentation tanks. The sewage is held in the primary sedimentation tanks until some of the suspended solids settle out by gravity. During this process, suspended particles agglomerate, shrink, lose some of their water, and ultimately settle. However, this gravity settling process is intolerably slow, requiring several hours as compared with only a few minutes for the grit separation. Furthermore, far too much of the suspended solids fails to agglomerate and therefore remains suspended. Since the primary sedimentation process is continuous so that raw sewage is continuously pumped into the primary sedimentation tanks, the buildup of unsettled solids rapidly overloads these tanks. This buildup of the suspended solids in influent sewage is extremely undesirable because it makes it necessary to employ extra steps to reduce the biological oxygen demand (B.O.D.) of this sewage before it can be discharged into natural streams.

In accordance with the present invention it has been found that the addition of a small amount of a particular acrylamide-alkali metal or ammonium acrylate copolymer to the raw influent sewage provides a highly effective and economical means of increasing the solids recovery and decreasing the "hold" time. The copolymer of the present invention effects these substantial improvements by (1) increasing the floc size, (2) increasing the floc density, and these in turn give not only a (3) substantially faster sedimentation rate but also (4) an appreciable increase in percent of total solids recovered.

The effectiveness of the particular copolymer of the present invention as a flocculant in raw influent sewage treatment has been demonstrated both in the laboratory and in actual practice as experienced in sewage treatment plants. Both qualitative and quantitative data were obtained in these demonstrations.

The following examples illustrate various embodiments of the present invention. These examples are not intended to limit the present invention beyond the scope of the appended claims. In these examples and elsewhere herein parts and percent and ratios are by weight unless otherwise indicated. All molecular weights given in the examples and elsewhere herein of the copolymers were measured as reduced specific viscosity (RSV) employing the well known Ubbelohde viscometer on a 0.1% solution of the copolymer in 0.1 M KCl at 25° C.

EXAMPLES 1–9

Laboratory runs—Qualitative

These runs were carried out to determine the effect of various polymeric flocculating agents on the recovery of suspended solids from an aqueous raw influent sewage slurry. In these particular experiments only qualitative determinations were made, i.e. visual observations.

One liter of raw influent sewage containing 350 p.p.m. suspended solids was placed in each of a series of clean 1-liter glass beakers on a Phipps-Bird Flocculator. Flocculating agent was then added to the sewage slurry and the resulting mixture stirred at 100 r.p.m. for 3 minutes. Then the mixture was slowly stirred at 12 r.p.m. for an additional 10 minutes. Stirring was discontinued and the mixture allowed to stand for 15 minutes. After standing, each sewage sample thus treated was visually examined to determine the effectiveness of the flocculating agents employed.

The beakers used are conventional and are designed specifically for use in this type flocculator. The Phipps-Bird Flocculator is conventional equipment widely used in this field. It consists simply of a bank of variable speed paddles and the beakers.

Further details appear in Table 1 hereinafter.

TABLE 1.—LABORATORY RUNS, QUALITATIVE

Effect of Various Polymeric Flocculating Agents on Suspended Solids Settled From Raw Influent Sewage

| | Flocculating Agent | | | Visual Observations | |
|---|---|---|---|---|---|
| | Name | Amount [1] | RSV | Flocculation | Settling |
| Example No.: | | | | | |
| 1 | None | None | | None | None. |
| 2 | Sulfonated Polystyrene [2] | 1.5 | | Poor | Poor. |
| 3 | do | 2.0 | | Fair | Fair. |
| 4 | do | 3.0 | | Good | Good. |
| 5 | 90% Acrylamide-10% Sodium Acrylate | 0.5 | 17 | do | Do. |
| 6 | do | 1.0 | 17 | do | Do. |
| 7 | do | 2.0 | 17 | do | Fair. |
| 8 | do | 3.0 | 17 | do | Do. |
| 9 | 50% Acrylamide-50% Sodium Acrylate | 0.25 | 68 | do | Good. |

[1] P.p.m. dry weight basis by weight of total sewage treated, added as a 0.01% aqueous solution.
[2] Flocculating agent available commercially as "Purifloc A-21."

EXAMPLES 10–15

Laboratory runs—Quantitative

These runs were carried out to determine the effect (quantitative determination) of various polymeric flocculating agents on the recovery of suspended solids from an aqueous raw influent sewage slurry.

One liter of raw influent sewage containing 350 p.p.m. suspended solids was placed in each of several clean 1-liter graduated cylinders. Flocculating agent was then added to the sewage slurry and mixed therewith by inverting the graduated cylinders 8 times, after which the cylinders were allowed to stand for 1 hour. A portion of the supernatant was pipetted from each of the graduated cylinders at the 800-ml. mark and filtered through a weighed Gooch crucible. The crucible was oven dried 1 hour at 110° C. and reweighed to determine the per cent total solids settled.

Further details appear in Table 2 hereinafter.

TABLE 2.—LABORATORY RUNS, QUANTITATIVE

[Effect of Various Polymeric Flocculating Agents on Suspended Solids Settled From Raw Influent Sewage]

| Ex. No. | Flocculating Agent | | | Percent Solids Settled [2] |
|---|---|---|---|---|
| | Name | Amount [1] | RSV | |
| 10 | None | None | | 62 |
| 11 | Sulfonated Polystyrene | 1.0 | | 81 |
| 12 | 90% Acrylamide-10% Sodium Acrylate | 0.25 | 17 | 91 |
| 13 | do | 5.0 | 17 | 98 |
| 14 | 50% Acrylamide-50% Sodium Acrylate | 0.05 | 68 | 73 |
| 15 | do | 0.1 | 68 | 84 |

[1] P.p.m. dry weight basis by weight of total sewage treated, added as a 0.01% aqueous solution.
[2] Based on influent solids of 350 p.p.m.

EXAMPLES 16–19

Sewage plant runs—Quantitative

These runs were carried out to determine the effect (quantitative determination) of various polymeric flocculating agents on the recovery of suspended solids from an aqueous raw influent sewage slurry. A 0.05% aqueous solution of flocculating agent was fed into the sewage treatment plant at a point just prior to the flow of the sewage (containing 372 p.p.m. suspended solids) into the primary sedimentation tanks. Samples were taken from the effluent (supernatant overflow) from the primary sedimentation tanks and the percent solids determined from these. The sampling time, i.e. the time between addition of the flocculating agent and making this determination on the treated samples, was approximately 2 hours.

Further details appear in Table 3 hereinafter.

TABLE 3.—SEWAGE PLANT RUNS, QUANTITATIVE

[Effect of Various Polymeric Flocculating Agents on Suspended Solids Recovery from Raw Influent Sewage]

| Ex. No. | Flocculating Agent | | | Percent Solids Settled [2] |
|---|---|---|---|---|
| | Name | Amount [1] | RSV | |
| 16 | None | None | | 30 |
| 17 | Sulfonated Polystyrene | 0.75 | | 74 |
| 18 | 90% Acrylamide-10% Sodium Acrylate | 0.10 | 24 | 73 |
| 19 | do | 0.19 | 24 | 96 |

[1] P.p.m. dry weight basis by weight of total sewage treated, added as a 0.05% aqueous solution.
[2] Based on influent solids of 372 p.p.m. and sampling time of approximately 2 hours.

From the foregoing examples it is readily apparent that the particular copolymer flocculating agent of the present invention, as compared with typical polymeric flocculating agents of the prior art, gives substantially improved flocculation both from the standpoint of increased rate of flocculation and total amount of suspended solids recovery. The amount of flocculating agent of the present invention required is also considerably less than that of the prior art. Very small amounts give substantial improvements in both rate of flocculation and total amount of suspended solids recovery. For instance, as little as 0.19 p.p.m. by weight of the total sewage being treated gave as much as 96% suspended solids recovery (Table 3, Example 19). About 0.05–5 p.p.m., dry weight basis by weight of the total sewage treated, of the particular copolymer flocculating agent of the present invention gives these improvements to a substantial degree. Preferably the amount of copolymer flocculating agent used in accordance with the present invention will be about 0.1–3 p.p.m., dry weight basis by weight of the total sewage treated, 0.1–1 p.p.m. being specifically preferred. Those skilled in the art to which this invention relates will appreciate that sewage systems vary tremendously and that the amount of any given flocculating agent employed will vary accordingly. The foregoing examples were carried out on the same sewage system.

The copolymer flocculating agents of the present invention consist of acrylamide and alkali metal or ammonium acrylate. The preferred acrylate is sodium acrylate. These copolymers consist by weight thereof essentially of 95%–25% acrylamide and 5%–75% acrylate, preferably 90%–50% acrylamide and 10%–50% acrylate. The weight percentage compositions given herein and in the claims are calculated on sodium acrylate, and it will be obvious and these will vary somewhat (and to what extent they will vary) when other acrylates (e.g. potassium acrylate) are used in place of sodium acrylate.

Preparation of the particular copolymer employed in the present invention is not claimed herein nor is it per se a part of the present invention. However, the preparation of said copolymer is quite important. In fact, applicants know of only one process which will produce a product having the properties of the particular copolymer applicable in the present invention. For the sake of completeness this process will now be disclosed. It may be referred to as precipitation polymerization.

This precipitation process broadly comprises polymerizing a solution of acrylamide and acrylate monomers in aqueous tertiary butanol, aqueous acetone or aqueous tertiary butanol-acetone in the substantial absence of air while agitating the solution to give a copolymer product that can be isolated by filtration, the aqueous tertiary butanol and aqueous acetone being solvents for the monomers but nonsolvents for the copolymer product.

Several of the conditions of this precipitation polymerization process are critical, and these conditions will now be discussed.

The solvent for the monomers must be aqueous tertiary butanol, aqueous acetone, or aqueous tertiary butanol-acetone (i.e. mixtures of water with tertiary butanol or acetone alone or with both). The concentrations of water in said mixtures must be 30%–65%, preferably 45%–60%, by weight of said mixtures.

The polymerization reaction temperature must be 0° C.–60° C., preferably 0° C.–40° C.

The polymerization may be carried out either in the presence or absence of a polymerization catalyst (initiator), but preferably a polymerization initiator will be used. Both the types and amounts of free radical initiator applicable are well known in this art. Peroxygen compounds are quite suitable, including e.g. ammonium persulfate, potassium persulfate and hydrogen peroxide. Other free radical initiators include e.g. α,α'-azo-bis-isobutyronitrile. The peroxygen initiators may be used alone or in combination with activators (also well known in this art) including e.g. sodium bisulfite, sodium thiosulfate, tetramethylethylene-diamine, thiourea and ferrous chloride, said combination forming a redox system. The amount of initiator usually will not exceed 0.5%, preferably is 0.05%–0.2%, 0.05% being specifically preferred, by weight of the combined weight of monomers.

Atlhough not necessary, preferably the precipitation polymerization is carried out in the presence of a salt dissolved in the polymerization reaction mixture. By polymerizing in the presence of a salt, or a buffer system comprising one or more salts in combination with another material to complete the buffer system, recovery of the copolymer product is substantially facilitated. These salts and buffer systems include, e.g., (1) alkali metal and ammonium acetates, carbonates, bicarbonates, chlorides, phosphates, sulfates, bisulfates, borates; (2) buffer systems comprising (a) mixtures of weak acid or weak base and their salts including (b) phthalates, citrates, borates, phosphates, acetates, ammonium hydroxide, ammonium acetate, ammonium chloride, (c) specific combinations including mixtures of boric acid-borax, citric acid-sodium acid phosphate, sodium carbonate-sodium bicarbonate, ammonium chloride-ammonium hydroxide, ammonium acetate-ammonium hydroxide; or (3) any combination of (1), and (2).

The amount of salt which may be used is about 0.1%–2.0%, preferably about 0.2%–0.7%, by weight of the reaction mixture. If the amount of salt exceeds about 2.0%, usually there is a tendency for the granules of the polymeric product to agglomerate in the polymerization reaction mixture. The manner of adding the salt and the point at which it is added are not critical.

The following is a specific example wherein the precipitation process was used in preparing the particular copolymer applicable in the present invention.

To a glass reactor fitted with a stirrer and reflux condenser cooled with ice water were charged 26.6 parts of sodium hydroxide and 210 parts of water. After dissolving and cooling, 47.9 parts of acrylic acid was added gradually with cooling to maintain the temperature below 20° C. The pH of this solution was 6.4. Then 62.5 parts of acrylamide, 222 parts of tertiary butanol, and 0.425 part of 30% hydrogen peroxide were added. The atmosphere and dissolved air were replaced with nitrogen by a series of evacuations and repressurizations with nitrogen. The temperature was raised to 25° C. and the vacuum adjusted to maintain reflux at that temperature. Then 25 parts of a 2.28% solution of thiourea in 1:1 water: tertiary butanol was pumped in at a uniform rate during 2.9 hours. During this time the copolymer formed and precipitated. After 3 hours, the slurry was diluted first with 200 parts of tertiary butanol and then 200 parts of acetone. After filtering off the liquid, the copolymer was washed with acetone and then dried at 50° C. in a vacuum oven. There was obtained 115 parts of copolymer containing 94.5% solids. The RSV of the copolymer was 73. The copolymer contained 50 weight percent acrylamide and 50 weight percent sodium acrylate.

The copolymer flocculating agents of the present invention have surprisingly high molecular weights. These were determined, as indicated hereinbefore, by measuring the reduced specific viscosity (RSV—Ubbelohde) of a 0.1% solution of the copolymer in 0.1 M KCl at 25° C. The RSV varies directly with the amount of acrylate in the copolymer. The copolymers disclosed and claimed herein have an RSV of about 8–110, preferably about 17–80. Stated in another way, the following copolymers, e.g., of the present invention have the following approximate RSV values:

8–28, preferably 14–28, for a 95% acrylamide-5% acrylate copolymer

10–35, preferably 17–35, for a 90% acrylamide-10% acrylate copolymer

30–80, preferably 40–80, for a 50% acrylamide-50% acrylate copolymer

43–110, preferably 54–110, for a 25% acrylamide-75% acrylate copolymer

Operating within the conditions of the process disclosed hereinbefore for making the copolymers applicable in the present invention, RSV varies directly with total monomer concentration and inversely with polymerization temperature and amount of initiator.

Although the flocculating agent in accordance with the present invention may be added in dry form to the sewage being treated, it is preferred to add it as an aqueous solution in order to get faster and more complete dispersion thereof throughout the sewage slurry.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of treating raw influent sewage slurry which comprises contacting said sewage slurry with an acrylamide-acrylate copolymer allowing the resulting slurry to settle, thereby (1) increasing the rate at which suspended solids flocculate and settle out of said sewage and (2) increasing the amount of suspended solids which flocculate and settle out, said copolymer being prepared by polymerizing said monomers at a temperature of about 0° C.–60° C. in a mixture of (a) tertiary butanol and water, (b) acetone and water, or (c) tertiary butanol, acetone and water, the amount of water in said mixture being about 30%–65% by weight thereof.

2. Process of claim 1 wherein the copolymer consists by weight thereof essentially of 95%–25% acrylamide and 5%–75% sodium acrylate.

3. Process of claim 1 wherein the copolymer consists by weight thereof essentially of 90%–50% acrylamide and 10%–50% sodium acrylate.

4. Process of treating raw influent sewage slurry which comprises stirring a mixture of said sewage slurry and a small amount of an acrylamide-acrylate copolymer allowing the resulting slurry to settle, thereby (1) increasing the rate at which suspended solids flocculate and settle out of said sewage and (2) increasing the amount of suspended solids which flocculate and settle out, said copolymer being prepared by polymerizing said monomers at a temperature of about 0° C.–60° C. in a mixture of (a) tertiary butanol and water, (b) acetone and water, or (c) tertiary butanol, acetone and water, the amount of water in said mixture being about 30%–65% by weight thereof.

5. Process of claim 4 wherein the amount of said copolymer employed is about 0.05–5 p.p.m., dry weight basis by weight of the total sewage treated.

6. Process of claim 4 wherein the amount of said copolymer employed is about 0.1–3 p.p.m., dry weight basis by weight of the total sewage treated.

7. Process of claim 4 wherein the amount of said copolymer employed is about 0.1–1 p.p.m., dry weight basis by weight of the total sewage treated.

References Cited
UNITED STATES PATENTS 3,247,102   4/1966   Priesing et al. _____ 210—54 X
3,377,274   4/1968   Burke et al. _____ 210—54 X MICHAEL E. ROGERS, Primary Examiner U.S. Cl. X.R.

260—80.3